Patented Nov. 20, 1945

2,389,406

UNITED STATES PATENT OFFICE 2,389,406

PRODUCTION OF OLEFINIC HYDROCARBONS

Herman S. Bloch, Riverside, and Raymond E. Schaad, Chicago, Ill., assignors to Universal Oil Products Company, Chicago, Ill., a corporation of Delaware No Drawing. Application January 20, 1944, Serial No. 518,996

14 Claims. (Cl. 260—683.2)

This application is a continuation-in-part of our co-pending application Serial No. 256,760 which was filed February 16, 1939, now U. S. Patent No. 2,346,657, issued April 18, 1944.

The process of this invention relates to the treatment of normal butane.

In a more specific sense, the invention is concerned with a process whereby normal butane is converted into substantial yields of isobutene and normal butenes. The process involves the use of special catalysts and particular conditions of operation which favor dehydrogenation and isomerization reactions so that relatively high yields of the iso and normal butenes are produced.

Recently the butenes have become of considerable importance to the petroleum industry as a result of demands for high anti-knock fuel suitable for use in high compression aviation engines. They occur as constituents of cracked gases formed in plants operating primarily to produce gasoline, and can be produced also by the catalytic dehydrogenation of butanes which occur in large quantities in natural gases and in still and tank gases of petroleum refineries. The butenes and butanes (in which the normal compounds usually predominate) may be considered as more or less marginal compounds in respect to their desirability in ordinary gasoline; that is, a certain percentage of them is essential for sufficient vapor pressure to insure ease in starting, while an excess tends to produce vapor lock. For these reasons, the percentage of 4-carbon atom hydrocarbons is commonly adjusted in conjunction with the boiling range and vapor pressure of the other gasoline components to produce a gasoline of desirable starting characteristics according to seasonal demands. Since there is thus an over-production of the 4-carbon atom hydrocarbons, and especially of normal butane, processes are being developed for their more efficient utilization, for instance in the production of isooctane and aviation gasoline.

Considering the corresponding mono-olefins, the normal butenes are considerably more difficult to polymerize, either thermally or catalytically, than isobutene, and it is found that the octenes representing the dimers of isobutene are of higher anti-knock value than those from n-butenes, which holds also for the octanes produced by hydrogenation. Therefore, it is of considerable importance at the present time to convert as much as possible of the normal butane production into isobutene.

In one embodiment the present invention comprises the simultaneous treatment of normal butane with a dehydrogenation and isomerization catalyst at elevated temperatures under atmospheric and relatively low super atmospheric pressure whereby a substantial portion of said normal butane is converted into isobutene and normal butenes.

According to the process of the present invention, normal butane is converted to a substantial degree into isobutene and normal butenes by passage through chambers containing a mixture of granules, powders or shaped particles, of dehydrogenation and isomerization catalysts at temperatures of from about 900° to about 1100° F. under atmospheric or slight superatmospheric pressure for relatively short times of contact of about 0.01 to about 5.0 seconds.

The butenes in the resultant gas mixture may be utilized for the production of octanes of high anti-knock value by a combination of successive steps involving catalytic polymerization and hydrogenation of the resultant octenes, or these butenes may be used in other hydrocarbon conversion reactions, such as alkylations in which olefins are combined with isoparaffins or with other hydrocarbons.

In experimenting with methods and conditions for converting paraffin hydrocarbons into olefins by dehydrogenation, a considerable number of catalytic materials have been tried with greater or lesser effectiveness, since it has been found, generally, that better results in the matter of yield of olefins without the formation of liquid and gaseous by-products are obtained by the use of catalysts rather than by the use of heat alone. Furthermore, under proper catalytic influences, temperatures, pressures and time factors are lower, so that less expensive apparatus may be employed and greater capacities insured.

The dehydrogenation catalysts which are preferred in the process of the present invention, have been evolved as the result of a large amount of investigation with catalysts having a dehydrogenating action upon various types of hydrocarbons, such as, for example, those which are encountered in the fractions produced in the distillation and/or pyrolysis of petroleum and other naturally occurring oil mixtures. The criterion of an acceptable dehydrogenating catalyst is that it shall split off hydrogen without inducting either scission of the bonds between carbon atoms or carbon separation.

It should be emphasized that in the field of catalysis there have been very few rules evolved which would enable the prediction of what materials will catalyze a given reaction. Most of the catalytic work has been done on a purely empirical basis, though at times certain groups of elements or compounds have been found to be more or less equivalent in accelerating certain types of reactions. For example, the noble metals, platinum and palladium, have been found to be effective in dehydrogenating reactions, particularly in dehydrogenating naphthenes to form aromatics, but these metals are expensive and easily poisoned by traces of sulfur so that their use is limited considerably in petroleum hydrocarbon reactions.

The process of the present invention is characterized by the use of mixtures of dehydrogenation and isomerization catalysts. The dehydrogenation catalysts utilizable comprise a particular group of composite catalytic materials which employ as supports or carriers, certain refractory oxides and silicates which in themselves may have some slight specific catalytic activity in the dehydrogenating reactions, but which are improved greatly in this respect by the addition of certain promoters, or secondary catalysts in minor proportions, which comprise the compounds and particularly the oxides of the elements in the left-hand columns of Groups V and VI of the periodic table; including vanadium, columbium, and tantalum; and chromium, molybdenum, tungsten and uranium, respectively.

While the compounds, and particularly the oxides of these elements, are effective catalysts in the dehydrogenation reactions, it is not intended to infer that the different compounds of any one element, or the corresponding compounds of the different elements, are exactly equivalent in their catalytic activity.

In general, practically all of the compounds of the preferred elements will have some catalytic activity in dehydrogenating paraffin hydrocarbons, though as a rule the oxides, particularly the lower oxides, are the best catalysts. Catalytic composites may be prepared by utilizing the soluble compounds of the elements in aqueous solutions from which they are adsorbed by prepared granular carriers, or from which they are deposited upon the carriers by evaporation of the solvent. The invention further comprises the use of dehydrogenation catalyst composites made by mechanically mixing relatively insoluble compounds with carriers either in the wet or dry condition.

The carriers or supporting materials for these promoter compounds are preferably of a rugged and refractory character, capable of withstanding the severe use to which the catalysts are put in regard to temperature during service and in reactivation by means of air or other oxidizing gas mixtures, after they have become fouled with carobnaceous deposits after a period of service.

As examples of materials which may be employed in granular form as supports for the preferred catalytic substances may be mentioned the following:

| | |
|---|---|
| Magnesium oxide | Montmorillonite clays |
| Aluminum oxide | Kieselguhr |
| Bauxite | Crushed silica |
| Bentonite clays | Crushed firebrick |
| Glauconite (greensand) | |

In regard to the carriers or supporting materials which are preferably employed in the preparation of dehydrogenation catalysts, some precautions are necessary to insure that they possess proper physical and chemical characteristics before they are impregnated with the promoters to render them more efficient.

Magnesium oxide, which may be employed alternatively, is conveniently prepared by the calcination of the mineral magnesite, which is most commonly encountered in a massive or earthy variety and rarely in crystal form, the crystals being usually rhombohedral. In many natural magnesites the magnesium oxide may be replaced to the extent of several percent by ferrous oxide. The mineral is of quite common occurrence and readily obtainable in quantity at a reasonable figure. The pure compound begins to decompose to form the oxide at a temperature of 662° F., though the range of decomposition only reaches a practical value at considerably higher temperatures, usually of from about 1472° to about 1652° F. Magnesite is related to dolomite, the mixed carbonate of calcium and magnesium, which latter mineral, however, is not of as good service as the relatively pure magnesite in the present instance. Magnesium carbonate prepared by precipitation, or by other chemical methods, may be used alternatively in place of the natural mineral, thus permitting its use as the active constituent of masses containing spacing materials of relatively inert character, and, in some cases, allowing the production of catalysts of higher efficiency and longer life. It is not necessary that the magnesite be converted completely to oxide, but, as a rule, it is preferable that the conversion be at least over 90%, that is so that there is less than 10% of the carbonate remaining in the ignited material.

Aluminum oxide, which is generally preferable as a base material for the manufacture of dehydrogenation catalysts, for use in the present process, may be obtained from some natural aluminum oxide minerals or ores, such as bauxite; or carbonates, such as Dawsonite by proper calcination; or it may be prepared by precipitation of aluminum hydroxide from solutions of aluminum sulphate, nitrate, chloride, or different other salts, and dehydration of the precipitate of aluminum hydroxide by heat. Usually it is desirable and advantageous to further treat it with air or other gases, or by other means to activate it prior to use.

One anhydrous and three hydrated aluminum oxides occur in nature as minerals. The dry oxide, $Al_2O_3$, is known as corundum and is a very hard and dense material which exists in a variety of forms, none of which has appreciable value as a support in the preparation of dehydrogenation catalysts. The hydrated oxides, diaspore, bauxite, and gibbsite correspond to the hydrated aluminum oxides with 1, 2 and 3 molecules of water, respectively. Of these three hydrated minerals only the oxides produced by the calcining of the two minerals, corresponding to hydration with two and three molecules of water, respectively, are suitable for the manufacture of the present type of catalyst; and these materials, in some instances, have given the best results of any of the catalyst supports whose use is at present contemplated. Dawsonite, having a formula $$Na_3Al(CO_3)_3.2Al(OH)_3$$

is another mineral which may be used as a source of aluminum oxide. The calcination of this mineral gives an alkalized aluminum oxide, which is apparently more effective as a support in that the catalyst is reactivated more easily after a period of use.

It is good practice in the final steps of preparing aluminum oxide as a catalyst support or carrier to ignite it for some time at temperatures of from about 1112° to about 1382° F. This does not correspond to complete dehydration of the hydrated oxide but gives a catalytic material of good strength and porosity so that it is able to resist for a long period of time the deteriorating effects of the service and regeneration periods to which it is subjected.

In the case of the clays which may serve as base catalytic materials for supporting promoters, the preferred materials are those which have been acid treated to render them more siliceous. These may be pelleted or formed in any manner before or after the addition of the promoter catalyst, since ordinarily they have a tendency to crumble under mechanical pressure to make a high percentage of fines. The addition of certain of the promoters, however, exerts a binding influence so that the formed materials may be employed without the fear of structural deterioration in service.

The most general method for adding promoting materials to the preferred catalyst supports (to produce dehydrogenation catalysts), which if properly prepared have a high adsorptive capacity, is to stir the prepared granules of approximately 4-20 mesh into solutions of salts which will yield the desired promoting compounds on ignition under suitable conditions. In some instances granules or finely divided particles of the alumina hydrogel may be merely stirred in slightly warm solutions of salts until the dissolved compounds have been retained on the particles by adsorption or occlusion, after which the particles are separated from the excess solvent by settling or filtration, washing with water to remove the excess solution, and then ignited to produce the desired residual promoter. In case of certain compounds of relatively low solubility, it may be necessary to add the solution in successive portions to the adsorbent catalyst support with intermediate heating to drive off the solvent, in order to get the desired quantity of promoter deposited upon the surface and in the pores of the catalyst carrier or support. The temperatures used for drying and calcining after the addition of the promoters from solutions will depend entirely upon the individual characteristics of the compound added and no general ranges of temperature can be given for this step.

In some instances promoters may be deposited in solution by the addition of precipitants which cause the deposition of dissolved materials upon the catalyst granules. As a rule, methods of mechanical mixing are not preferable though in some instances, in the case of hydrated or readily fusible compounds, these may be mixed with the proper proportions of catalyst supports and uniformly distributed during the condition of fusing or fluxing.

In regard to the relative proportions of the catalyst support and promoting materials, it may be stated in general that the latter generally represent from about 1 to about 20% by weight of the total composites. Optimum proportions of carriers and dehydrogenation activating oxides vary with methods of preparation, and effective catalysts can be produced in which the percentage of activating compound is greater than 20%. The effect upon the catalytic activity of the catalyst supports, caused by varying the percentage of any given compound, or mixture of compounds, deposited thereon is not a matter for exact calculation but more one for determination by experiment. Frequently good increases in catalytic effectiveness are obtainable by the deposition of as low as 1 or 2% of a promoting compound on the surface and in the pores of the catalyst support, although the general average is from about 5 to about 10%.

The preferred isomerization catalysts may be prepared by a number of alternative methods which have certain necessary features in common, as will subsequently be described. Generally speaking, however, the catalysts may be considered to comprise intimate molecular combinations of silica with alumina and thoria, and silica with thoria, all of which components possess more or less low activity individually but display high activity in the aggregate. The activity is not an additive function, it being relatively constant for a wide range of proportions of the components whether in molecular proportions or fractions of molecular proportions. No one component may be determined as the one component for which the remaining components may be considered as the promoters according to conventional terminology, nor can any component be definitely fixed as the support and the others as the catalyst proper.

According to one general method of preparation the preferred isomerization catalyst may be prepared by precipitating silica from solution as a hydrogel and subsequently admixing or depositing the hydrogels of alumina and thoria or thoria alone with a hydrated silica. One of the more convenient methods of preparing the silica hydrogel is to acidify an aqueous solution of sodium silicate by the addition of an acid such as hydrochloric acid, for example. The excess acid and the concentration of the solution in which the precipitation is brought about determine in some measure the suitability of the silica hydrogel for subsequent deposition thereon of the hydrogel of thoria or the hydrogels of alumina and thoria. In general, suitable hydrated silica may be produced by the use of dilute solutions of sodium silicate and the addition of a moderate excess of acid whereby the desired active silica gel is obtained and conditions of filtering and washing are at an optimum.

After precipitating the silica hydrogel, it is treated and washed to substantially remove alkali metal ions. It is not known whether the alkali metal ions, such as sodium ions, are present in the primary gel in chemical combination, or in an adsorbed state but it has been determined definitely that their removal is necessary if catalysts are to be obtained suitable for prolonged use in accelerating hydrocarbon conversion reactions of the present character. It is possible that the presence of the alkali metal impurities causes a sintering or fluxing of the surfaces of the catalyst at elevated temperatures so that the porosity is much reduced with corresponding reduction in effective surface. Alkali metal ions may be removed by treating with solutions of acidic materials, ammonium salts, or salts of aluminum and thorium or thorium alone. When treating with acids, as for example with hydrochloric acid, the acid extracts the alkali metal impurities in the silica gel. The salts formed and acid are then substantially removed by water washing treatment. Where ammonium salts, or salts of aluminum and thorium or thorium alone are used, the ammonium or multivalent metals used apparently displace the alkali metal impurities present in the composite and the alkali metal salts formed, together with the major portion of the multivalent salts, are removed in the water washing treatment. Some of the multivalent metals introduced into the silica hydrogel in the purifying treatment may become a permanent part of the composite, whereas in the treatment with ammonium salts small amounts of the ammonium salts remaining after the washing process will be driven off in subsequent treatment at elevated temperatures.

In one of the preferred methods of compositing the hydrogel materials, the purified precipitated hydrated silica gel may be suspended in a solution of aluminum, and thorium salts or thorium salts alone in the desired proportion and the hydrogels deposited upon the suspended silica hydrogel by the addition of volatile basic precipitants, such as ammonium hydroxide, ammonium carbonate, ammonium hydrosulfide, ammonium sulfide, or other volatile basic precipitants, such as organic bases may be employed. According to this method, the purified silica gel may be suspended in a solution of aluminum chloride and thorium nitrate or thorium nitrate alone, for example, and the hydrated alumina and thoria or thoria alone precipitated by the addition of ammonium hydroxide.

Alternatively the purified silica gel may be mixed while in the wet condition with separately prepared hydrated alumina and hydrated thoria precipitated either separately or concurrently, as for example by the addition of volatile basic precipitants to solutions of aluminum and thorium salts. The hydrated alumina and hydrated thoria thus prepared are substantially free from alkali metal ions and can be mixed with purified silica gel. However, if alkali metal ions are incorporated as when the hydrated alumina is prepared from sodium aluminate, for example, when thorium tetrahydroxides are precipitated by the interaction of thorium nitrate and sodium hydroxide, regulated purification treatment and water washing, by methods selected from those described in connection with the purification of hydrated silica gel to remove alkali metal ions will be required. Care should be observed in the selection and concentration of reagents used so as not to dissolve unduly large amounts of alumina or thoria.

As further alternatives, purified silica gel may be added to a solution of salts of aluminum and thorium and hydrated alumina and hydrated thoria deposited by hydrolysis with or without the use of heat, or the purified silica gel may be mixed with suitable amounts of salts of aluminum and thorium as, for example, in forming a paste and heating whereby alumina and thoria are deposited upon the silica gel as a result of the decomposition of the aluminum and thorium salts.

In the methods above described, a silica hydrogel free from alkali metal ions was admixed or had deposited thereon relatively pure hydrated alumina and hydrated thoria prior to the drying treatment. In methods described below, the hydrated silica and the hydrated alumina and hydrated thoria are concurrently precipitated or admixed and treated to remove the alkali metal ions from the composited material prior to drying treatment, either in the presence of the original reactants or subsequent to water washing. Thus, solutions of silicon compounds, more usually alkali metal silicates and soluble aluminum and thorium salts may be mixed under regulated conditions of acidity or basicity to jointly precipitate hydrated silica, hydrated alumina, and hydrated thoria in varying proportions. For example, solutions of sodium silicate, aluminum chloride and thorium nitrate may be mixed and an alkaline or acid reagent added according to the proportions used so that a pH in the range of from about 3 to about 10 is obtained. In cases where a sol is formed, the precipitation may be brought about if the sol is acid by the addition of a volatile base, as for example, ammonium hydroxide, and alkali metal salts removed by water washing, or the composite may be treated as indicated above in connection with the purification of the hydrated silica to remove alkali metal ions. Various methods are possible for the preparation of the hydrated silica, hydrated alumina and hydrated thoria separately or in combination and the purifying treatment is necessary where alkali metal ions are present in substantial amounts.

The character and efficiency of the ultimately prepared silica will vary more or less with precipitation and/or mixing, purification treatment, ratio of components, calcining, etc., a specific example being given below. The ratio of the components may be varied within wide limits, the limiting factor being more in evidence with respect to small proportons than with large proportions of the various components. In general, it appears that from about 2 to about 6 mol percent of alumina and thoria together, with reference to silica, may be considered an approximation of the minimum proportions. Because thorium is relatively expensive, it is generally desirable to use relatively low proportions of it in the order of less than one mol percent of the total catalyst.

After the alumina and thoria have been mixed with or deposited on the purified silica gel and water washed, if desired, as described for one general method of preparation, or after the hydrated silica, hydrated alumina and hydrated thoria or hydrated silica and hydrated thoria have been composited and treated to remove the alkali metal ions, as described for another general method of preparation, the catalytic materials may be recovered as a filter cake and dried at a temperature of from about 240° to about 300° F., more or less, after which it may be formed into particles of a suitable average definite size ranging from powder to various forms and sizes obtained by pressing and screening, or otherwise formed into desirable shapes by compression or extrusion methods.

By calcining at a temperature of from approximately 850° to about 1000° F., or higher, the maximum activity of the catalyst is obtained and a further dehydration occurs so that, for example, after a considerable period of heating at 900° F., the water content, as determined by analysis, is of the order of 2 to 3%.

Isomerizing catalysts prepared by the various types of procedures outlined above evidently possess large total contact surfaces corresponding to a desirable porosity, the pores of the catalyst particles being of such size and shape that they do not become clogged with carbonaceous deposit after a long period of service and are, therefore, not difficult to reactivate by oxidation. This structure is retained, also, after many alternate periods of use and reactivation, as evidenced by the fact that the catalysts may be reactivated rapidly by passing air or other oxidizing gas over the used particles to burn off the deposits of carbonaceous materials at temperatures above 800° F., temperatures as high as 1400° to 1600° F., having been reached without apparently affecting the catalytic activity.

In practicing the simultaneous dehydrogenation of butane and isomerization of butenes to produce substantial yields of isobutene, according to the present process, a solid composite catalyst mixture comprising isomerization and dehydrogenation catalysts, prepared according to the foregoing alternative methods, is used as a filler in a reaction tube or chamber in the form of particles of graded size or small pellets or powders, and the butane to be dehydrogenated is passed therethrough after being heated to the proper temperature, under a definite pressure and for a time of contact adapted to produce the desired result. Instead of using an intimate mixture of granules or shaped particles of dehydrogenation and isomerization catalysts, it is within the scope of this invention to employ a catalyst charge consisting of alternate adjacent sections of these two types of catalysts. The catalyst chamber may be heated exteriorly, if desired, to maintain the proper reaction temperature.

It has been found essential to the efficient dehydrogenation of butane and simultaneous isomerization of the resultant butenes, when using the present types of catalysts, that the gaseous charge be substantially free from water vapor. If appreciable amounts of steam are present the catalytic activity is adversely affected so that the active life is shortened, the need for reactivation becomes more frequent and the point is reached more quickly where reactivation is no longer effective. The reasons for this phenomenon are not entirely clear, but may possibly be due to a certain degree of hydration of the more active catalytic components of the mixtures, or the hydration of such supports as aluminum oxide or magnesium oxide.

The exit gases from the reaction tube or chamber may be passed through selective absorbents to combine with or absorb the butenes produced. The isobutene and normal butenes may be made to polymerize in the presence of suitable catalysts, they may be used to alkylate other hydrocarbons such as aromatics or isoparaffins, or treated directly with chemical reagents to produce desirable derivatives. After the olefins have been removed, the residual gases may be recycled for further dehydrogenating and isomerizing treatment with or without removal of the hydrogen.

Since as a rule the isobutene and normal butenes in the resultant gas mixture will correspond to substantially a relatively constant proportion of these two components, a procedure is suggested which involves their mixed polymerization to form iso-octenes without attempting to separate the gaseous reaction products. This polymerization may be effected under revised conditions of operation using a suitable catalyst, such as solutions of sulfuric acid, metal phosphates as of calcium and of cadmium, the so-called "solid phosphoric acid" catalyst, etc., which involves preferably the segregation of butane-butene fraction from the light gases and any heavier products and the subjection of the recovered intermediate butane-butene fraction to polymerization. Each polymerization catalyst, which may be used alternatively, will exert its own specific influence, will not be identical to that of other members of the class, and will require particular conditions for effecting optimum results.

Use of the "solid phosphoric acid" catalyst for such polymerization is preferably effected under what may be termed "critical" phase conditions; namely, pressures of from about 500 to about 700 lbs. per square inch, temperatures of from about 225° to about 325° F., and preferably a long time of contact of from about 100 to about 350 seconds. Under these conditions it has been found that mixed polymerization of isobutene and normal butenes is favored so that properly proportioned mixtures are converted almost quantitatively into mixtures of isooctenes, which are readily hydrogenatable, to a large extent, into 2,2,4-trimethylpentane, a standard of reference in anti-knock test work.

Members of the present mixed catalysts comprising dehydrogenation and isomerization catalysts are selective in removing two hydrogen atoms from butane to produce butenes of both normal and branched chain structures without further undesirable side reactions to any substantial degree, and because of this, give long periods of activity in service as will be shown in a later example. When, however, their dehydrogenating and isomerizing activities diminish, they are readily reactivated by the simple expedient of oxidizing with air, or with other oxidizing gas at a moderately elevated temperature, usually within the range employed in the dehydrogenation and isomerization reactions. This oxidation effectively removes carbon deposits which contaminate the particles and decrease their efficiency. It is characteristic of the present types of catalyst mixtures that they may be reactivated rapidly without material loss of porosity or catalyzing efficiency.

While the chemical reactions involved in the production of isobutene from normal butane are not understood clearly or completely, they apparently involve not only dehydrogenation but also isomerization accompanied by some polymerization and cracking. In reference to the present invention, no attempt is made to indicate that any relationship exists between dehydrogenation, isomerization, and cracking in the operation of the process herein described. Obviously in view of the complexity of the reactions involved the concepts expressed above should not be misconstrued to limit unduly the scope of the invention.

The descriptive material of the present specification is directed to the contacting of normal butane with dehydrogenation-isomerization catalyst mixtures, but it is comprised within the scope of the present invention to subject other paraffin hydrocarbons to contact with the same types of mixed catalysts to produce substantial yields of iso-olefins with molecular weights corresponding approximately to those of the paraffin hydrocarbons undergoing treatment.

The following numerical data are introduced to indicate typical results obtainable in producing isobutene-normal butene mixtures from normal butane by the present process, although it is not intended to limit the scope of the invention in strict accordance therewith:

A dehydrogenation catalyst was prepared by first adding chromium trioxide to an activated alumina by making a paste with a solution of chromic acid and evaporating to dryness on a water bath. The resultant powder was pressed hydraulically, crushed and screened to produce granules which were later heated. The catalyst as finally prepared comprised approximately 85% by weight of aluminum oxide, 10% by weight of chromium sesquioxide, and 5% by weight of water.

An isomerization catalyst prepared according to the process of the present invention comprised a mass corresponding approximately to 200 mols of silica ($SiO_2$), 10 mols of alumina ($Al_2O_3$), and 1 mol of thoria ($ThO_2$). The general procedure observed in preparing this catalyst was to precipitate silica gel, wash and treat to free it from alkali metal ions, suspend the purified precipitated silica in a solution containing both aluminum chloride and thorium nitrate, and precipitate hydrogels of alumina and thoria in the presence of the suspended silica hydrogel by the use of ammonium hydroxide.

1650 parts by weight of a commercial grade of sodium silicate (equivalent to 8 molecular portions of $SiO_2$) was diluted with 7000 parts by weight of distilled water. A solution of hydrochloric acid (5 normal) was prepared by diluting 562 parts of concentrated (12 normal) hydrochloric acid with water to a total volume corresponding to 1350 parts. The dilute hydrochloric acid solution was added gradually to the diluted sodium silicate (stirred mechanically) which was then further diluted by the addition of 1000 parts of water. After the addition of the total quantity of the dilute acid solution, the precipitated silica gel was collected on a filter, then slurried in 4000 parts of water and again filtered, this operation being repeated several times. Secondly, in order to remove the alkali metal ions still remaining as impurities in the washed silica gel by further treatment with dilute hydrochloric acid, the silica gel was slurried in 4000 parts of water containing 40 parts of the diluted (5 normal) hydrochloric acid, the treatment being repeated twice. The precipitate was then subsequently washed several times with water, with 4000 parts by volume of an aqueous solution containing 21 parts by weight of ammonium chloride and then several times with water.

1160 parts by weight corresponding to 2.8 molecular portions of the purified silica hydrogel was suspended in 3000 parts of an aqueous solution containing 67.6 parts by weight of aluminum chloride hexahydrate (0.28 molecular portion) and 7.72 parts by weight of thorium nitrate tetrahydrate (0.014 molecular portion). To this suspension approximately 75 parts by weight of concentrated ammonium hydroxide solution was added with stirring until the reaction mixture was basic to litmus, after which the precipitated silica-alumina-thoria mass was collected on a filter. The filter cake was dried by heating in air for approximately 16 hours at a temperature increasing gradually from 220° to 300° F. The dried powder was then pressed and broken up to obtain particles of approximately 6 to 10 mesh particle size which were calcined in a stream of dry air at approximately 900° F. for 6 hours, during which time moisture and some ammonium chloride were expelled from the catalytic mass.

The dehydrogenation and isomerization catalysts prepared, as indicated above, were separately formed into granules by pressing hydraulically, crushing, and screening to produce particles of 6–10 mesh size. Thirty parts by volume of the 10% chromium sesquioxide on alumina dehydrogenation catalyst and 30 parts by volume of the activated silica-alumina-thoria isomerization catalyst were mixed and placed in a tube through which heated normal butane was passed.

Substantial yields of isobutene were obtained from normal butane at approximately 1000° F., under atmospheric pressure when the charging rate was so controlled that the gaseous space velocities were of the approximate order of 265 to 910 with reference to the combined gross volumes of the dehydrogenation and isomerization catalysts which corresponded to approximate contact times of 1.0 to 5.0 seconds. Under such conditions the gaseous products obtained in one pass from the n-butane consisted of approximately 4.4–4.5% isobutene, 13.5–14.6% n-butenes, 23–33% hydrogen, and 40–55% n-butane, together with small amounts of decomposition products. At 932° F. the dehydrogenation and isomerization percentages were lower; while at approximately 1112° F., considerable decomposition occurred with the formation of methane, ethane, ethylene, propane, and propene at the expense of butane and butenes even when operating at higher space velocities corresponding to contact times of from about 0.1 to about 1.0 second, which were evidently longer than desirable for production of high yields of isomeric butenes, or the dehydrogenation and isomerization catalysts were not proportioned properly for optimum results.

Composite dehydrogenation-isomerization catalysts, which had been used on normal butane for running times of from about 1.5 to about 3.6 hours and had become partially covered with carbonaceous materials, were reactivated to substantially their original activities by heating in a stream of dry air at 900° to 1000° F., for times of from 1.5 to 4.0 hours, after which they were returned to further use in producing isobutene-normal butene mixtures from normal butane.

Further work showed that it was more advantageous to employ mixtures of particles of dehydrogenation and isomerization catalysts rather than to use mixed catalysts formed by grinding together the two types of catalysts and compressing the mixed powder into the form of granules. For example, in the later runs in the presence of granules formed from the mixed powders of dehydrogenation and isomerization catalysts, n-butane at 990° F., and atmospheric pressure with a gas space velocity of 415, gave 1.2% isobutene, 14.8% n-butenes, 23.9% hydrogen, 50.8% n-butane as the major products, together with 3.6% methane, 0.2% carbon monoxide, 0.5% ethylene, 2.7% ethane, 2.2% propene, 0.8% propane, and 2.3% pentanes. In other runs at lower and higher space velocities, 0.5–1.5% isobutene accompanied a normal butene production of 12.4–16.1%.

The character of the process of the present invention and particularly its commercial value are evident from the preceding specification and limited numerical data presented, though neither section is intended to be unduly limiting in its generally broad scope.

We claim as our invention:

1. A process for producing normal and iso-olefins which comprises subjecting a normal paraffin to the simultaneous action of a dehydrogenating catalyst comprising alumina and a promoter comprising a compound of an element selected from the left-hand columns of Groups V and VI of the periodic table and an isomerizing catalyst comprising a composite of silica and thoria.

2. The process of claim 1 further characterized in that said isomerizing catalyst comprises a composite of silica, alumina and thoria.

3. A process for producing normal and iso-olefins which comprises subjecting a paraffin to the simultaneous action of a dehydrogenating catalyst comprising aluminum oxide and chromium oxide and an isomerizing catalyst comprising a composite of silica and thoria.

4. The process of claim 3 further characterized in that said isomerizing catalyst comprises a composite of silica, alumina and thoria.

5. A process for producing isobutene and normal butenes which comprises subjecting normal butane to the simultaneous action of a dehydrogenating catalyst comprising alumina and a promoter comprising a compound of an element selected from the left-hand columns of Groups V and VI of the periodic table and an isomerizing catalyst comprising a composite of silica and thoria.

6. The process of claim 5 further characterized in that said isomerizing catalyst comprises a composite of silica, alumina and thoria.

7. A process for producing isobutene and normal butenes which comprises subjecting normal butane to the simultaneous action of a dehydrogenating catalyst comprising aluminum and chromium oxides and an isomerizing catalyst comprising a composite of silica and thoria.

8. The process of claim 7 further characterized in that said isomerizing catalyst comprises a composite of silica, alumina and thoria.

9. A process for producing normal and iso-olefins which comprises subjecting a normal paraffin at a temperature of from about 900° F. to about 1100° F. to the simultaneous action of a dehydrogenating catalyst comprising an oxide of an element selected from the left-hand columns of Groups V and VI of the periodic table and an isomerizing catalyst comprising silica and thoria.

10. A process for producing normal and iso-olefins which comprises subjecting a normal paraffin at a temperature of from about 900° F. to about 1100° F. to the simultaneous action of a dehydrogenating catalyst comprising an oxide of an element selected from the left-hand columns of Groups V and VI of the periodic table and an isomerizing catalyst comprising silica, alumina and thoria.

11. A process for producing isobutene and normal butenes which comprises subjecting normal butane at a temperature of from about 900° F. to about 1100° F. to the simultaneous action of a dehydrogenating catalyst comprising an oxide of an element selected from the left-hand columns of Groups V and VI of the periodic table and an isomerizing catalyst comprising silica and thoria.

12. A process for producing isobutene and normal butenes which comprises subjecting normal butane at a temperature of from about 900° F. to about 1100° F. to the simultaneous action of a dehydrogenating catalyst comprising an oxide of an element selected from the left-hand columns of Groups V and VI of the periodic table and an isomerizing catalyst comprising silica, alumina and thoria.

13. The process as defined in claim 9 further characterized in that the dehydrogenating catalyst comprises alumina in addition to said oxide.

14. The process as defined in claim 11 further characterized in that the dehydrogenating catalyst comprises alumina in addition to said oxide.

HERMAN S. BLOCH.
RAYMOND E. SCHAAD.